(12) United States Patent
Haddad (10) Patent No.: US 7,949,876 B2
(45) Date of Patent: May 24, 2011

(54) METHOD AND NODES FOR OPTIMIZED AND SECURE COMMUNICATION BETWEEN ROUTERS AND HOSTS

(75) Inventor: Wassim Haddad, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1118 days.

(21) Appl. No.: 11/617,260

(22) Filed: Dec. 28, 2006

(65) Prior Publication Data
US 2008/0162936 A1 Jul. 3, 2008

(51) Int. Cl.
*H04L 29/06* (2006.01)
*H04L 9/32* (2006.01)
(52) U.S. Cl. .................... 713/171; 713/168; 713/150
(58) Field of Classification Search .................. 713/171, 713/168, 150
See application file for complete search history.

(56) References Cited

OTHER PUBLICATIONS

Bagnulo (Efficient Security for IPv6 Multihoming, 2005) year 2005.*
Sender Access Control in IP Multicast ; Islam, S.; Atwood, J.W.; Local Computer Networks, 2007. LCN 2007. 32nd IEEE Conference on; Publication Year: 2007 , pp. 79-86.*
Local key exchange for mobile IPv6 local binding security association; Changwen Liu; Soliman, H.; Vehicular Technology Conference, 2004. VTC 2004—Spring. 2004 IEEE 59th vol. 5 Publication Year: 2004 , pp. 2647-2655 vol. 5.*
A method for authentication and key exchange for seamless interdomain handovers; Soltwisch, R.; Xiaoming Fu; Hogrefe, D.; Narayanan, S.; Networks, 2004. (ICON 2004). Proceedings. 12th IEEE International Conference on vol. 2; Publication Year: 2004 , pp. 463-469 vol. 2.*
Narten; RFC-2461 "Neighbor Discovery for IP Version 6 (IPv6)"; Network Working Group Request for Comments: 2461 Dec. 1998.
Thomson; RFC-2462 "IPv6 Stateless Address Autoconfiguration"; Network Working Group Request for Comments: 2462; Dec. 1998.

* cited by examiner

*Primary Examiner* — David Y Jung (57) ABSTRACT

A method, a router and a host are introduced for providing secure communication with limited use of processing intensive cryptographic means. Strong cryptographic keys are first used between the host and the router to sign messages therebetween, thereby ensuring that a first communication between the host and the router is secure. The router generates a secret key and forwards it to the host, the secret key being encrypted at the router and decrypted at the host by use of the strong cryptographic keys. Further communication between the host and the router is signed by use of the secret key.

33 Claims, 8 Drawing Sheets

METHOD AND NODES FOR OPTIMIZED AND SECURE COMMUNICATION BETWEEN ROUTERS AND HOSTS

BACKGROUND OF THE INVENTION

1. Field of the Invention

The present invention relates to a method and to nodes, for supporting secure communication between routers and hosts.

2. Description of the Related Art

Internet Protocol version 6 (IPv6) is a network layer standard used by numerous types of electronic devices to exchange data across interrelated packet-switched networks. It is intended as a successor to IP version 4 (IPv4), which is presently ubiquitous and in general use. Compared to IPv4, IPv6 defines a much wider range of addresses.

Figure 1:
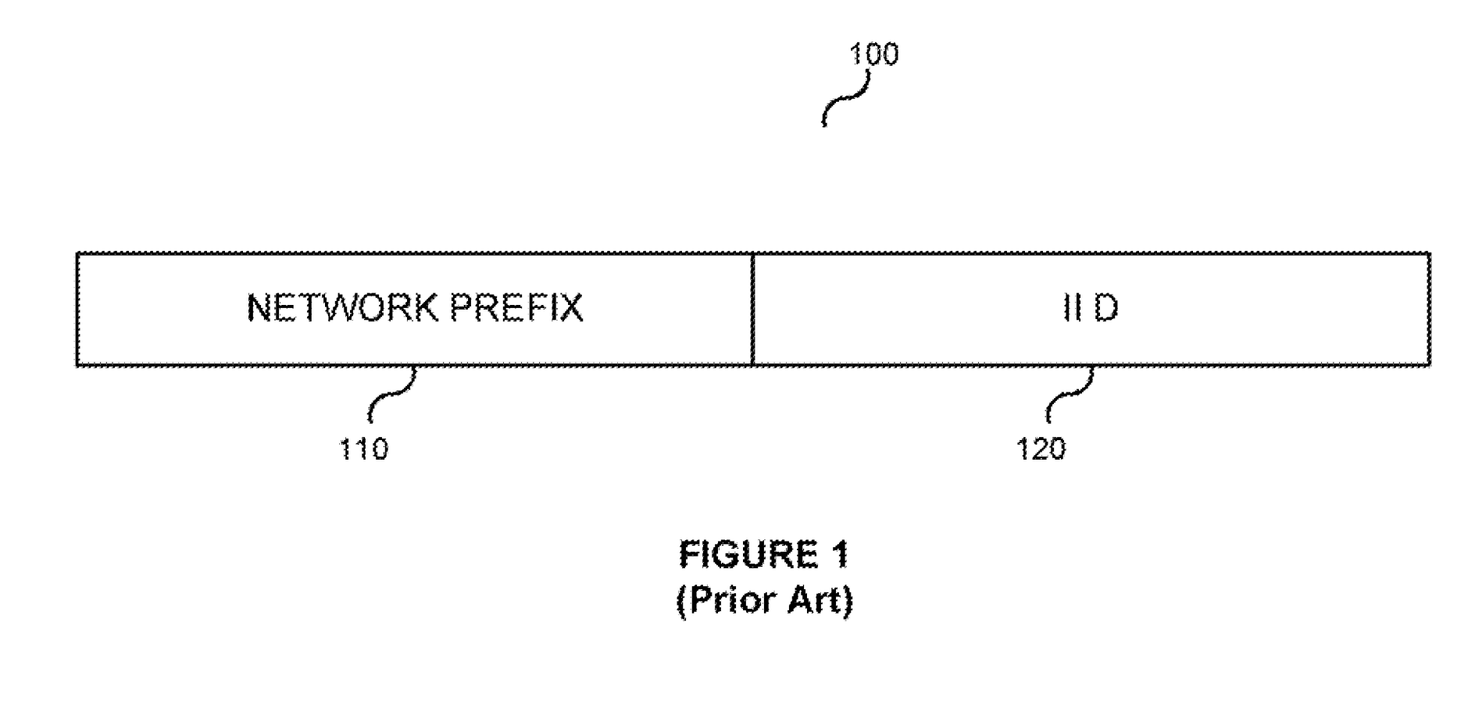
FIG. 1 is a prior art representation of a generic format of an IPv6 address.

FIG. 1 shows a generic format of an IPv6 address 100. The IPv6 address 100 is 128-bits long, and comprises a 64-bit network prefix 110 and a 64-bit Interface IDentifier (IID) 120. A device may have one or more permanent IPv6 addresses 100. In addition, one or more IPv6 addresses 100 may be allocated dynamically to the device. For example, an IPv6 address 100 may be allocated by a router serving the device, wherein the network prefix 110 is defined by the router. In principle, it is possible to route data packets towards the device using any permanent or dynamic IPv6 address 100 of the device, as long as the IPv6 address 100 is unique in the Internet. In practice, dynamic IPv6 addresses 100 are preferred because routing of data packets through the router to the device is facilitated by the fact that the network prefix 110 in the dynamic IPv6 address 100 of the device relates to the specific router serving the device.

In IPv6 a host, for example an end-user device, receives a connection service from an Access Router (AR). One or more hosts may be connected to one AR, for example by way of an Ethernet link, or through a radio link, and the like. The host needs to receive information from the AR in order to configure the IPv6 address 100, which will in turn enable the host to communicate with further nodes on the Internet. The AR sends the required information, comprising the network prefix 110 of the AR, in Router Advertisement messages (RtAdv) described in the Internet Engineering Task Force (IETF) Request For Comments (RFC) number 2461. The RtAdv may be broadcasted periodically by the AR for the benefit of all hosts on the same link. Alternatively, the host may not wait for the periodic RtAdv and send a Router Solicitation message (RtSol) to the AR. The AR may then respond with a dedicated RtAdv, intended for the host having sent the RtSol.

The RtAdv provides the network prefix 110 that is used by the host to configure its IPv6 address 100. The host adds its own IID 120 to the network prefix 110 to generate the IPv6 address 100. The host must then initiate a Duplicate Address Detection (DAD) procedure, described in the IETF RFC 2462, to ensure that no host currently linked to the same AR is using the same IPv6 address 100. In the event where the IPv6 address 100 configured by the host is already in use, as detected in the DAD procedure, the host needs to generate a distinct IPv6 address 100 by use of a different IID 120 and invoke again the DAD procedure. This process may be repeated as many times as required until the host finally acquires a unique IPv6 address 100.

Once the host has configured its IPv6 address 100, following proper verification that this address is unique, it receives further periodic RtAdv messages. These message generally comprise up to date information related to the manner in which the host receives service from the AR. The host updates this information in its internal memory.

Another party, for example a neighbor host on the same link or the AR itself, may need to communicate with the host. Communicating with the host requires knowing both its IPv6 address 100 of the host and a layer 2 address of the host, the layer 2 address being for example a Media Access Control (MAC) address in the case of an Ethernet link. It is necessary that the other party sends a Neighbor Discovery (ND) Request in multicast mode, capable of being detected by any device on the link. The host responds with a ND Advertisement that broadcasts the host's IPv6 address 100 and MAC address. The ND protocol is described in the IETF RFC 2461.

In the processes described hereinabove, there are several potential security issues. A malicious node could launch several types of Denial Of Service (DOS) attacks. The DOS attack is an attempt to make a device's resources unavailable to its intended user. By launching the DOS attack, the malicious node may force the host to consume its resources such that it can no longer provide its intended service. The malicious node may obstruct the link between the host and the AR so that they can no longer communicate adequately. When the host sends the RtSol message and then receives the RtAdv message, it does not know a priori whether the RtAdv is sent by a legitimate AR or by the malicious node. The malicious node may send the RtAdv in order to set up a DOS attack. Alternatively, when the host broadcasts its newly configured IPv6 address 100 as a part of the DAD procedure, the malicious node may consistently respond that it already holds the same IPv6 address 100, thereby launching a different type of DOS attack. Another type of DOS attack occurs when another party sends a ND Request; the malicious node may send the ND Advertisement in place of a legitimate host, thereby impersonating the legitimate host and stealing service therefrom.

Methods currently in use to avoid DOS attacks comprise signatures and encryption. Two communicating nodes each comprise a public Key (K+) and a private Key (K−). A node is the only entity that is aware of the value of its K−, but the K+ are known to everyone. When a first node sends a message to a second node, the first node may compute a signature, that is a result of encrypting a known value with its K−, and include the signature in the message. Upon receiving the message, the second node uses the K+ of the first node to decrypt the signature. If the known value is obtained from the decryption, this is a proof that the message was indeed sent by the first node. The signature provides a proof for validity and non-repudiability of the message sent by the first node. Public and private keys may also be used for encrypting messages. The first node may use the K+ of the second node to encrypt the content of a message intended for the second node. The second node is the only entity capable of decrypting the message by use of its own K−.

A protocol named SEcure Neighbor Discovery (SEND), defined by the IETF RFC 3971, solves the DOS attack issues mentioned hereinabove by use of signatures and encryption. SEND relies on Cryptographically Generated Address (CGA) keys used by both the host and the AR to provide a strong signature to every message exchanged between these nodes. Use of CGA public and private keys provides a proof of ownership of the addresses of the host, of the AR and of other parties. However, CGA signature is a heavy process which requires extensive processing power. Using the CGA keys to sign every message exchanged between the AR and the host adds significant delays to the exchange. When battery-powered hosts such as mobile nodes or sensors are used, CGA key signatures may further cause high battery consumption.

Another tool currently used in some systems to provide some level of security is a One-Way Hash (OWH) function. The OWH is a cryptographic hash function of a secret seed value, generally a random number, the result of which cannot be used to recover the value of the seed. A well-known example of hash function is called Secure Hash Algorithm (SHA), of which SHA-256 is preferably used because it provides a high level of security. The SHA function requires significantly less processing power than using the CGA keys. A One-Way Hash Chain (OWHC) is formed from a seed V(n) when the result of hashing V(n) is hashed again to produce a value V(n−1), repeating the process "n" times by hashing again the result of the hash, in sequence, to obtain a $n^{th}$ value V(i=0). Hashing of a value V(i+1), where "i" is smaller than "n" produces a value V(i). With a strong hashing algorithm such as the SHA-256, it is not possible to infer the value V(i+1) from the value V(i). Once a first sending node has demonstrated its validity to a second receiving node by any means, and the second receiving node knows a V(k) value of the first sending node, the first sending node may demonstrate its validity by sending a value V(k+1). The second receiving node may hash the value V(k+1) and obtain the value V(k), thereby obtaining a proof of the identity of the first sending node.

There would be clear advantages of having a method, a host and an access router, all relying on a limited use of heavy encryption means, for providing a high level of security against malicious attacks.

SUMMARY OF THE INVENTION

It is therefore a broad object of this invention to provide a method, host and an access router using Cryptographically Generated Address public and private keys, along with a secret key, to securely communicate without excessive use of processing capacity.

A first aspect of the present invention is directed to a method of communicating between a router and a host. The router first receives a cryptographic public key (CGA+) of the host. The router generates a secret key and then encrypts it by use of the CGA+ of the host. The router then sends towards the host the encrypted secret key. Thereafter, both the host and the router use the secret key to sign further messages sent between each other.

A second aspect of the present invention is directed to a router for communicating with a host. Within the router, an input port receives from the host a CGA+ of the host. A processing logic generates a secret key, and then encrypts it using the CGA+ of the host. An output port sends the encrypted secret key. The processing logic then calculates a message signature based on the secret key, and instructs the output port to send a message comprising the message signature.

A third aspect of the present invention is directed to a host for communicating with a router. Within the host, an output port sends towards the router a CGA+ of the host. An input port receives an encrypted secret key. A processing logic decrypts the secret key with a cryptographic private key (CGA−) of the host and stores it in a memory. The processing logic then calculates a secret key signature and instructs the output port to send towards the router a traffic message comprising the secret key signature.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a method for optimization of the SEcure Neighbor Discovery (SEND) protocol, described in the Internet Engineering Task Force (IETF) Request For Comments (RFC) number 3971. The present invention further provides an Access Router (AR) and a host supporting this optimization. The method uses a combination of a One-Way Hash Chain (OWHC) of length "n", and of Cryptographically Generated Address (CGA) public keys (CGA+) and CGA private keys (CGA−), to provide security of communication between the host and the AR. For the purposes of the present invention, a value V(i) of the OWHC, wherein "i" is in a range between zero and "n", is publicly disclosed on a link between the AR and hosts connected thereto. In a first place, the value V(i=0) is disclosed, for example in a multicast Router Advertisement message (RtAdv). Later, a value V(i+1) corresponding to a result of one less hashing iteration, is disclosed, and so on. CGA signatures are used in a first message pair exchanged between the host and the router, and a secret Key (Ks) is generated. Once the first message pair has been exchanged, CGA signatures are no longer used. Instead, the Ks is used to sign messages exchanged between the host and the router, and values of the OWHC are publicly disclosed in broadcast messages sent by the AR to enable the router to prove to the host that the broadcast messages are valid.

Figure 2:
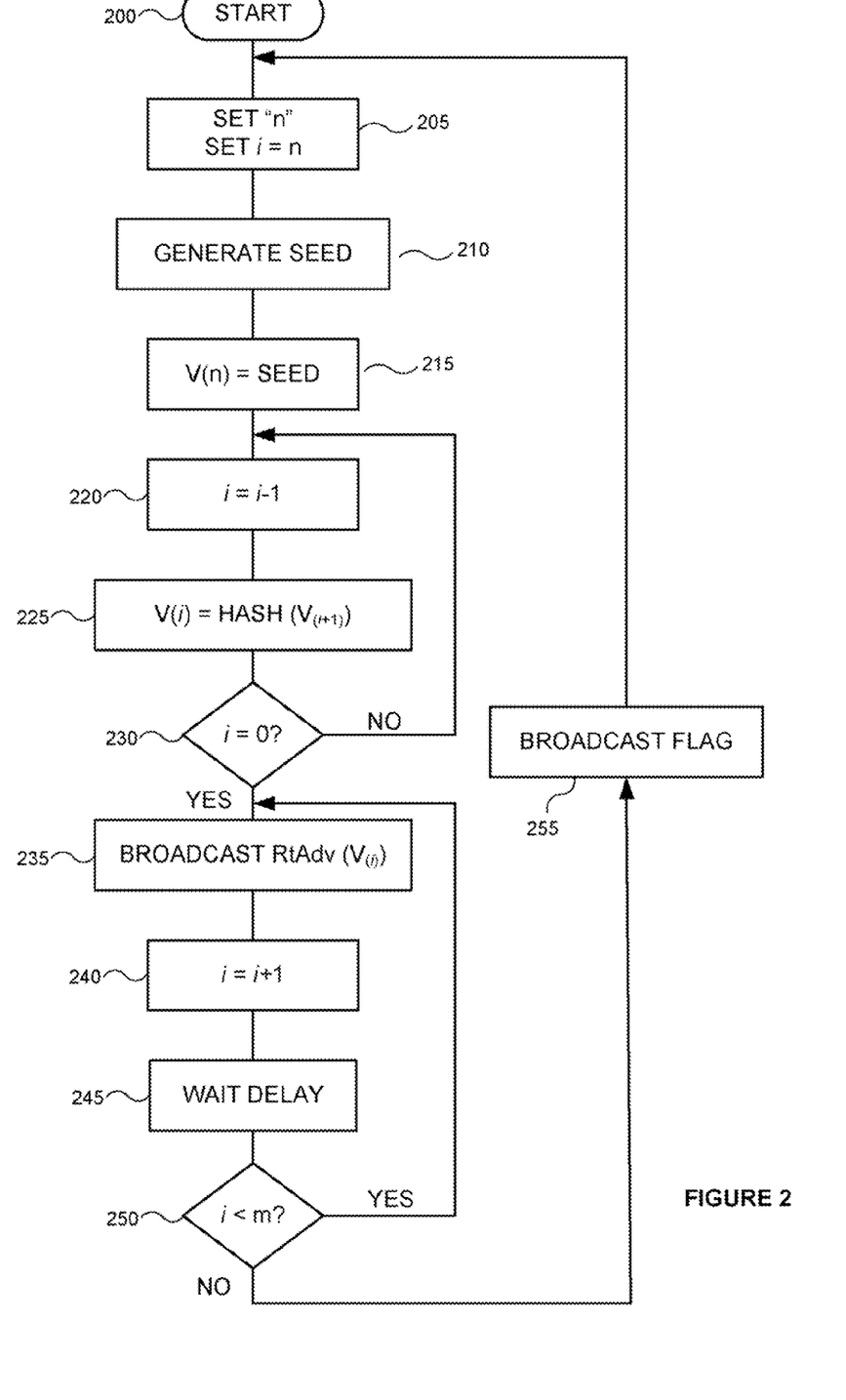
FIG. 2 illustrates how a one-way hash chain of length "n" is generated and used in periodic Router Advertisement messages.

FIG. 2 illustrates how a OWHC of length "n" is generated and used in periodic Router Advertisement messages (RtAdv). The process is initiated in the AR at step 200. At step 205, a range "n" is set and a counter "i" is initiated equal to "n". The range "n" defines the length of the chain and is preferably large, for example equal to 1000 (the length is actually equal to "n+1", which is inconsequential in the present invention). At step 210, a seed is generated by a random process. The seed is defined as a first value V(n) of the OWHC at step 215. The counter "i" is decremented by one at step 220. At step 225, a next value is entered in the OWHC by hashing the previous value. It can be observed that when step 225 is executed a first time, the counter "i" is equal to "n" and the actual seed is hashed. At step 230, it is verified whether the counter "i" has reached a value equal to zero. If not, the steps 220 and 225 are repeated. If at step 230 it is found that the counter "i" has reached zero, the OWHC is complete. At step 235, the periodic RtAdv is broadcasted, i.e. sent in multicast to the intent of all hosts connected to a link of the AR, the RtAdv carrying the value V(i). By broadcasting the RtAdv, the value V(i) becomes a publicly disclosed value of the OWHC. The first time step 235 is executed, value V(i=0) is the publicly disclosed value. There is always only one latest publicly disclosed value of the OWHC. At step 240, the counter "i" is incremented. The process pauses for a delay at step 245. The delay of step 245 is intended to regulate a periodicity of broadcasting the RtAdv messages. Typically, the periodic RtAdv is sent once every three seconds or at longer intervals. At step 250, it is verified if the counter "i" has reached a value equal to "m", wherein "m" is smaller than or equal to "n". If not, broadcast of the periodic RtAdv takes place again at step 235, with a new latest publicly disclosed value V(i) wherein the counter "i" has been incremented since the previous broadcast. As the process reaches again the step 250, if the counter "i" has reached the value "m", the process returns to step 205 where the OWHC is recalculated. If for example the periodic RtAdv is broadcasted once every 6 seconds, a OWHC with a length of 4,800 can last for up to 8 hours. Prior to recalculating the OWHC, the AR may broadcast a flag at step 255, warning all hosts on the link that the OWHC is being recalculated, implying that the latest publicly disclosed value will no longer be usable by the hosts. Use of the flag by the host is described hereinbelow in relation to FIG. 6.

Figure 3:
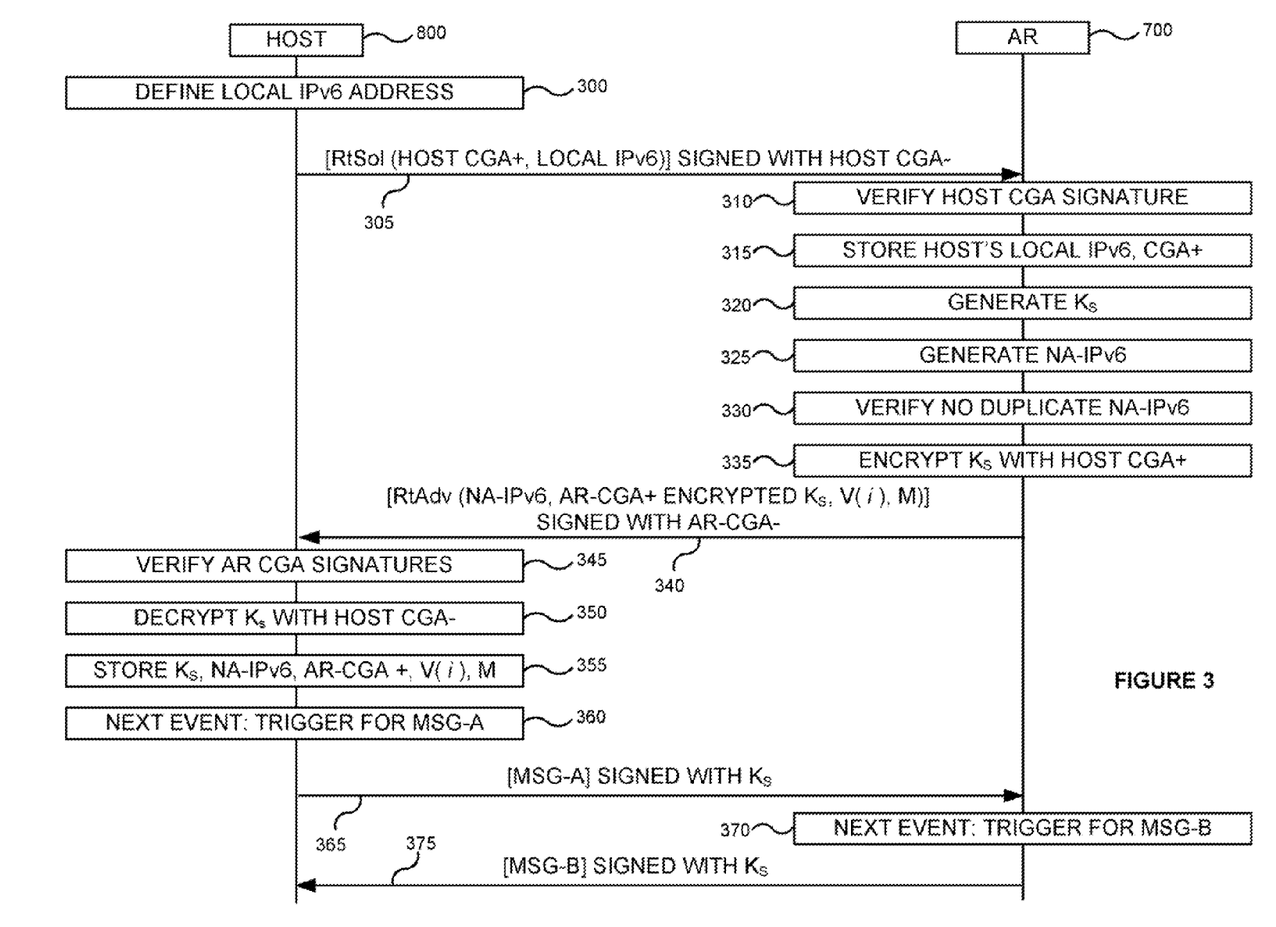
FIG. 3 shows a sequence for allocating an internet protocol address and a secret key in a secure manner for a host.

The latest publicly disclosed value of the OWHC as described in FIG. 2 is also sent in dedicated RtAdv messages intended for use by a single host, as will be described along with the description referring to FIG. 3. FIG. 3 shows a sequence for allocating an internet protocol address and a secret key in a secure manner for a host. An AR 700 and a host 800 are shown. The AR 700 and the host 800 communicate by use of a link offered by the AR 700. In the context of the present invention, the link may comprise an Ethernet link, a radio link, and the like. Other parties, comprising for example other access routers and other hosts, may also be present on the same link. At step 300, the host 800 defines for itself a local IPv6 address. The local IPv6 address has a format as shown in the foregoing description of FIG. 1. In the local IPv6 address, an interface identifier (IID) 120 is preferably generated through a hashing of a CGA+ of the host. A network prefix 110 is generally a fixed 64-bit value for the host. At step 305, the host sends a Router Solicitation message (RtSol) towards the AR 700. The RtSol comprises a cryptographic public key, or CGA+, of the host and the local IPv6 address, and has a signature calculated by the host by use of its own cryptographic private key, or CGA-. The CGA+ of the host could be sent in another message than in the RtSol, so use of the RtSol for carrying the CGA+ is exemplary. At step 310, the AR 700 verifies the signature of the RtSol by use of the CGA+ of the host. If the signature is invalid, the RtSol message is ignored by the AR 700 and the process ends. As long as the signature is valid, the AR 700 allocates at step 315 an entry in an internal cache memory for the host 800 and stores therein the host 800's local IPv6 address and CGA+. The process continues with generation of a secret key (Ks) for the host at step 320. The Ks is generated in any manner well-known in the art, but is preferably at least 100 bits long. A network assigned IPv6 address (NA-IPv6) is allocated at step 325. To generate this address, the AR 700 combines the IID included in the local IPv6 address of the host with one of its network prefixes. At step 330, the AR 700 preferably verifies through its cache memory that no two hosts have been allocated identical NA-IPv6 addresses. If another host has an identical NA-IPv6 address, the AR 700 assigns another NA-IPv6 address to the host 800 by use of the IID and of another network prefix. At step 335, the Ks is encrypted with the CGA+ of the host 800. Only the host 800 knows its own CGA-, so only it can decrypt the Ks. A dedicated RtAdv message is sent towards the host at step 340. The dedicated RtAdv comprises the NA-IPv6, a CGA+ of the AR 700 and the encrypted Ks, and may further comprise a Mobility indicator (M). The encrypted Ks could alternatively be sent towards the host 800 is another type of message besides the RtAdv. Use of the RtSol and of the RtAdv messages in the sequence of FIG. 3 represents a preferred embodiment. As will be explained hereinbelow, in relation to FIG. 5, the M indicator will enable the host to sign other RtSol messages with the Ks, thereby consuming less processing resources than in the case of a CGA signature. The dedicated RtAdv is signed with the CGA- of the AR 700. The dedicated RtAdv preferably further comprises the latest publicly disclosed value V(i) of the OWHC, disclosed in the latest periodic RtAdv broadcasted at step 235 of FIG. 2. At step 345, the host 800 having received the dedicated RtAdv verifies the signature of the message by use of the CGA+ of the AR 700. Provided the signature verification indicates that the message is valid, the host 800 decrypts the Ks by use of its own CGA- at step 350. The host 800 then stores in a memory the Ks, the NA-IPv6, the CGA+ of the AR, the V(i), and the M indicator if included in the RtAdv, at step 355. A next event may trigger a further exchange of one or more messages between the host 800 and the AR 700. In one case, the next event is a trigger at step 360 to send a message (MSG-A) from the host 800 towards the AR 700. The MSG-A is sent at step 365, comprising a signature based on the Ks. The AR 700 will be able to authenticate the signature of the MSG-A by use of the Ks stored in its cache memory. Alternatively, the next event is a trigger at step 370 to send another message (MSG-B) from the AR 700 towards the host 800. In one example, receipt of the MSG-A at step 365 and processing thereof by the AR 700 is the trigger of step 370. The MSG-B is sent at step 375, comprising a signature based on the Ks. The host 800 will be able to authenticate the MSG-B signature by use of the Ks stored in its memory.

Figure 4:
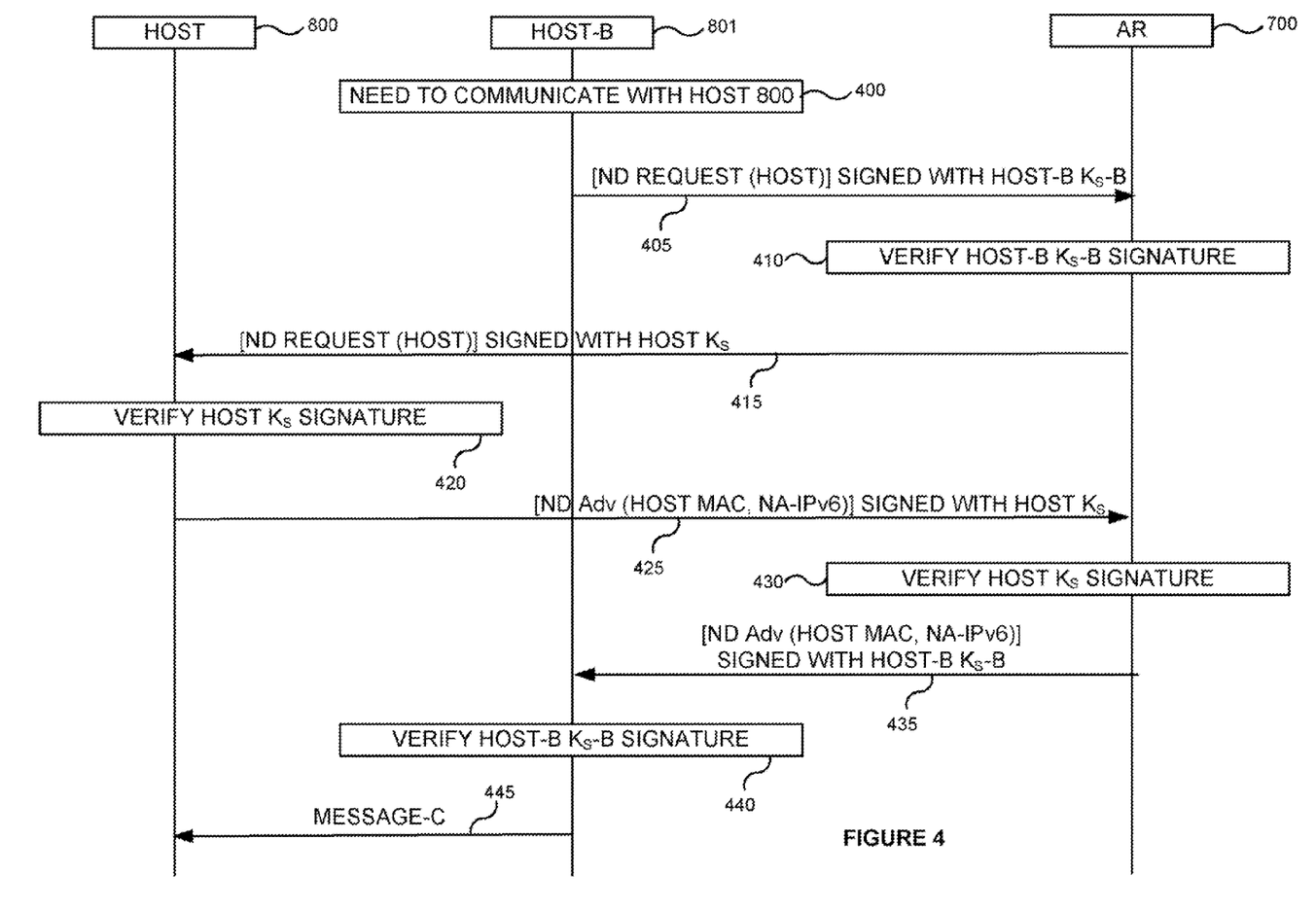
FIG. 4 shows a Neighbor Discovery procedure modified in accordance with the present invention.

An example of messages exchanged between hosts and the AR is described in relation to FIG. 4, which shows a Neighbor Discovery (ND) procedure modified in accordance with the present invention. ND Requests are no longer sent in multicast, with the intent of reaching a target host but capable of being detected by any router and by all hosts on a same Ethernet link. A requesting party, for example a neighbor host-B 801, determines that it has a need to communicate with the host 800 at step 400. The host-B 801 sends the ND Request in unicast mode, intended to the AR 700 only, at step 405. The ND Request is signed with a Ks-B of the host-B 801 and comprises an indication that the host 800 is the target of the ND Request. The AR 700 attests the validity of the requesting party by verifying the Ks-B signature at step 410. The AR 700 then forwards the ND Request towards the host 800 at step 415, this latter ND Request being signed with the Ks of the host 800. The host 800 verifies the Ks signature at step 420 and then replies to the AR 700 with a ND Advertisement signed with its own Ks at step 425. The ND Advertisement comprises a Media Access Control (MAC) address and the NA-IPv6 address of the host 800. The AR 700 verifies the validity of the host 800 by verifying its Ks signature at step 430 and forwards the ND Advertisement towards the host-B 801, signed with the Ks-B, at step 435. The host-B 801 verifies that last ND Advertisement at step 440 by use of the Ks-B signature. Having now acquired the MAC and the NA-IPv6 addresses of the host 800, the host-B 801 sends a message-C directly towards host 800 at step 445. It should be noted that in the foregoing description, only the AR 700 knows distinct Ks's allocated to each of the host 800 and the host-B 801.

Figure 5:
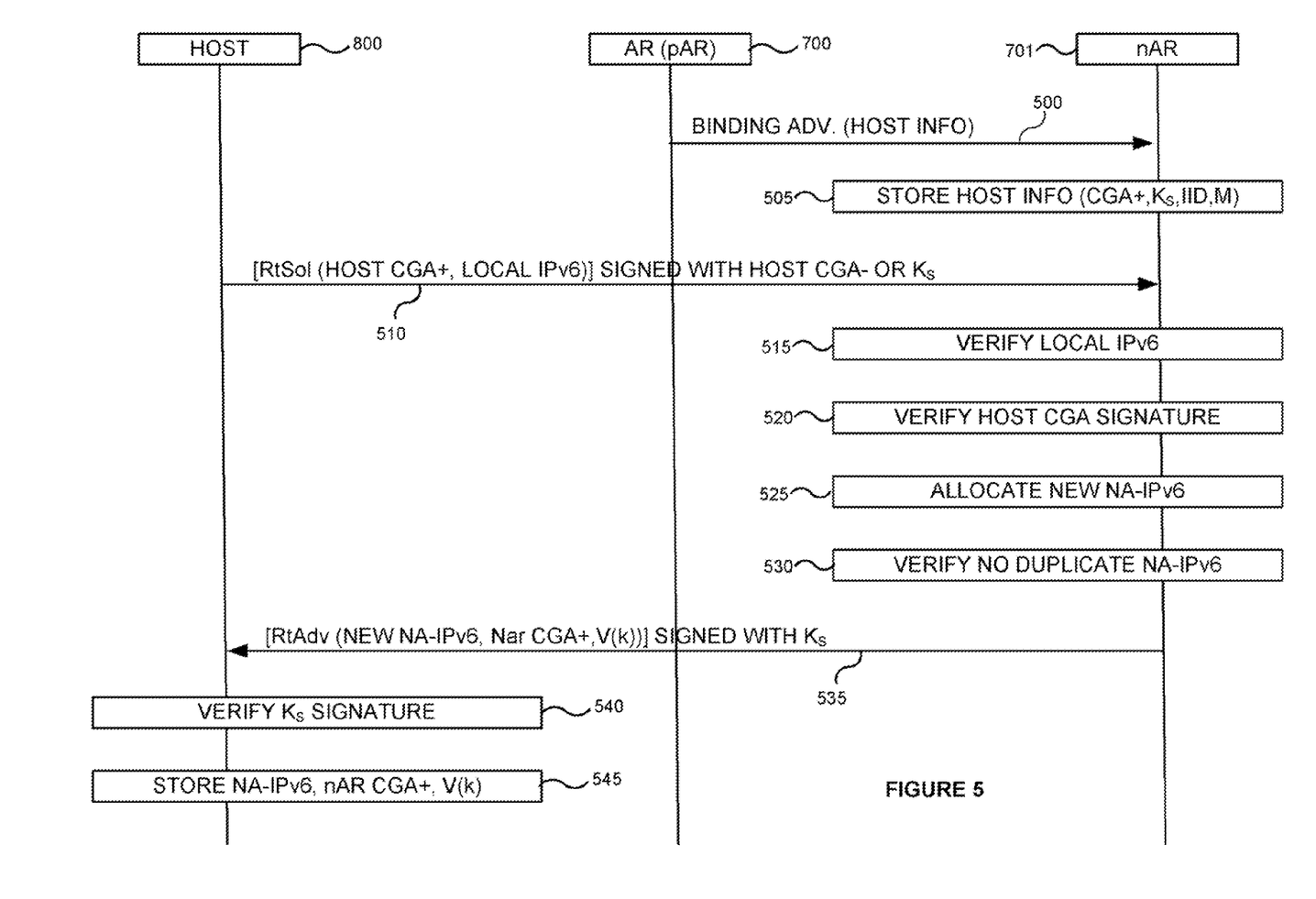
FIG. 5 shows a sequence for acquiring a new network assigned IPv6 address at the host with limited use of CGA key signatures.

Having set up a session with a first AR 700, the AR 700 being a previous AR (pAR), and having acquired the IPv6 address from the pAR, the host 800, which may be a mobile host, may move within an area served by a new AR (nAR). FIG. 5 shows a sequence for acquiring a new NA-IPv6 address at the host 800 with limited use of CGA key signatures. In preparation for an eventual change of attachment of the host 800, the AR 700 preferably sends towards one or more neighboring routers a Binding Advertisement message, comprising information of the host 800, at step 500. The neighboring routers, including a nAR 701, store the host 800 information comprising the CGA+, the IID and the Ks of the host 800, and possibly comprising the M indicator, in new entries within their cache memories, at step 505. Following a change of location, the host 800 sends at step 510 a new RtSol towards the nAR 801. The new RtSol comprises the local IPv6 address of the host and is preferably signed by the host 800. In one case, the RtSol is signed with the CGA− of the host 800. Alternatively, if the host 800 has stored, at step 355 of FIG. 3, the M indicator received from the AR 700, the host 800 signs the new RtSol with the Ks. The nAR 701 may validate the new RtSol in two steps: it uses the IID received from the pAR (i.e. from the AR 700) and stored in its cache memory to verify the local IPv6 address of the host 800 at step 515. If that verification is correct, the nAR further verifies, at step 520, the signature of the RtSol message, either with the CGA+ of the host 800 or with the Ks depending on a presence of the M indicator in the cache memory.

In some alternate embodiments, the nAR 701 has not received the Binding Advertisement of step 500 and has consequently not yet stored the host 800 information in its cache memory. In such cases, after receiving the RtSol at step 510, the nAR 701 may send a query message (not shown) towards its neighboring routers, the query comprising the local IPv6 address of the host 800. The AR 700 finds the local IPv6 in its cache memory and sends a Fast Binding Update message (not shown) towards the nAR 701, the Fast Binding Update message comprising the same information as in the Binding Advertisement message of step 500. The nAR 701 then stores the host 800 information as described at step 505. Validation of the new RtSol received by the nAR 701 at step 510 follows, as shown in the hereinabove description of steps 515 and 520.

The nAR 701 allocates a new NA-IPv6 address to the host 800 at step 525, using its own network prefix and the IID. Step 525 may comprise an internal Duplicate Address Detection (DAD) procedure. The nAR 701 then sends at step 535 a new dedicated RtAdv towards the host 800, comprising the newly assigned NA-IPv6 address, the CGA+ of the nAR 701, and a latest publicly disclosed value V(k) of a OWHC for the nAR 701. The RtAdv is signed with the Ks. The host 800 verifies the Ks signature of the RtAdv at step 540 and, if the signature is valid, stores the new NA-IPv6 address, the CGA+ of the nAR and the value V(k) at step 545.

Figure 6:
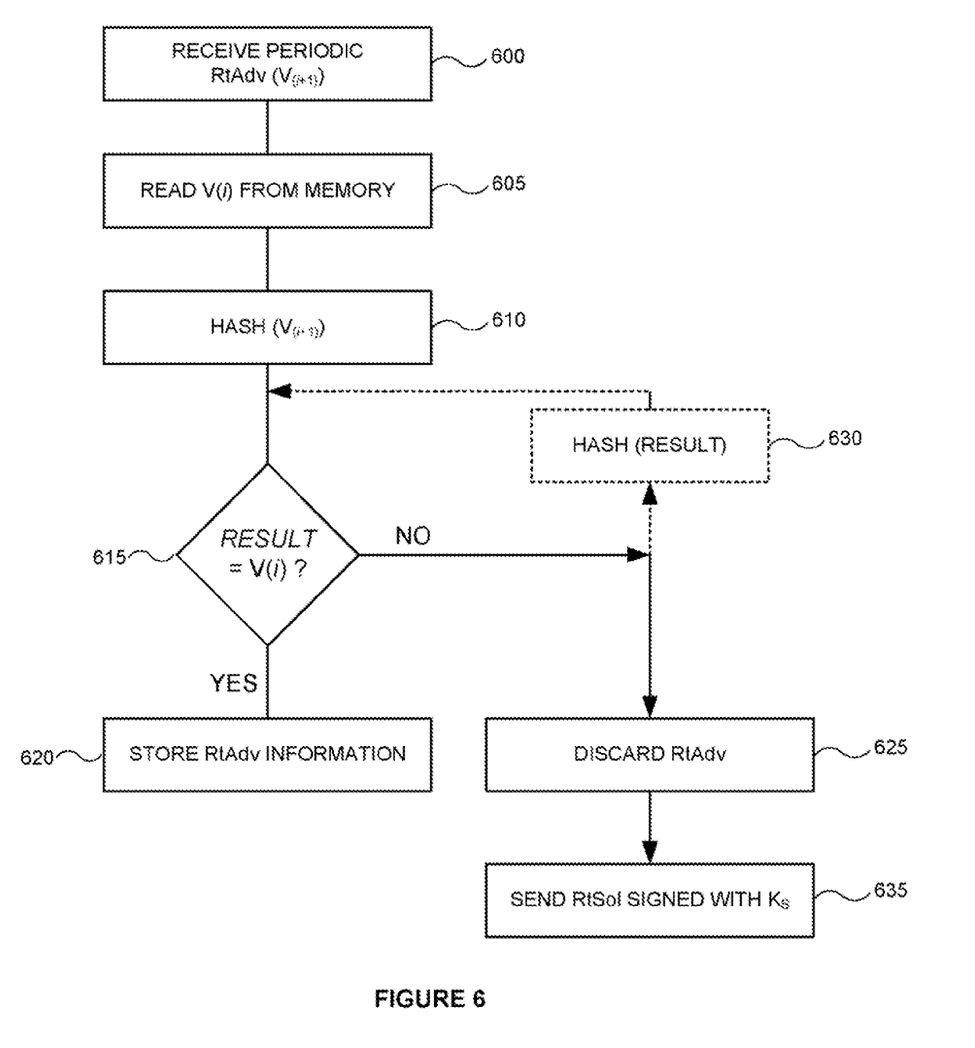
FIG. 6 shows a manner of using one-way hash chain values within the host.

The AR 700 serving the host 800 following the sequence of FIG. 3 (or the nAR 701 now serving the host 800 if the sequence of FIG. 5 has taken place) continues sending periodic RtAdv in multicast, intended for all hosts connected on the link. As described in relation to FIG. 2, each subsequent multicast RtAdv comprises a new value V(i+1) from the OWHC of the AR 700. FIG. 6 shows a manner of using OWHC values within the host 800. As detailed in the foregoing description of FIG. 2, each time a new periodic RtAdv is sent, it carries a new OWHC value V(i+1), which corresponds to one less hash iteration than the value V(i) of the previous periodic RtAdv.

At step 600, the host 800 receives the periodic multicast RtAdv comprising the V(i+1) value. The host 800 reads the V(i) value from its memory. The V(i) value may have been stored upon receipt of a previous dedicated RtAdv or multicast RtAdv. The V(i) may have been stored at step 355 of FIG. 3. The V(i) may actually be the V(k) received from the nAR 701 at step 535 of FIG. 5, and stored at step 545. Finally, the V(i) may be the value stored following receipt of the previous periodic RtAdv, in a previous instance of the sequence of FIG. 6. At step 610, the host 800 hashes the V(i+1) value. The host 800 then compares a result of the hashing with the previously stored V(i) value at step 615. If a match is positive, this new periodic RtAdv is deemed authentic and information contained therein is stored in the host 800 memory at step 620. Specifically, the V(i+1) value from the new periodic RtAdv is now stored as a new V(i) value at step 620. If the match of step 615 is negative, this new periodic RtAdv is discarded at step 625.

In some environments, reception of the periodic multicast RtAdv at the host 800 may have some impairments, due for example to noise in a radio environment or to packet collision on an Ethernet link. It is possible for the host 800 to miss receiving one or a few consecutive periodic RtAdv messages from the AR 700, and then correctly receive a valid new periodic RtAdv. The sequence of FIG. 6 may not be executed for one or a few periodic RtAdv messages not correctly received at the host 800 and, consequently, the V(i) value stored in the memory of the host 800 may be out of synchronization with the publicly disclosed values of the OWHC. Instead of ignoring the new periodic RtAdv following a first unsuccessful match at step 615, re-hashing the result of the first hash may take place at step 630, followed by a new comparison at step 615 of a second result with the value V(i). A positive match following the second hashing indicates that the host 800 has missed exactly one periodic RtAdv and that the newly received periodic RtAdv is valid. Preferably, in order to avoid any Denial Of Service attack, only a small number of re-hashing iterations is allowed, for example two or three iterations, before discarding the newly received RtAdv at step 625.

When the new periodic RtAdv is discarded at step 625, the host 800 has lost synchronization of the OWHC with the AR 700. The host 800 can no longer accept any new periodic multicast RtAdv. To regain a trusted RtAdv, the host 800 sends at step 635 a new RtSol towards the AR 700, preferably signed with the Ks, and comprising a lost synchronization indicator. A sequence similar to that shown in relation to FIG. 3 follows, wherein the AR 700 sends a new dedicated RtAdv, signed with the Ks and comprising a current V(i) value. Ks signatures are preferred in this case, over CGA signatures as depicted in FIG. 3, because the Ks is already known to both the host 800 and the AR 700, and because Ks signatures required less processing from the host 800. As long as the Ks is valid, no new Ks needs to be re-generated and no new NA-IPv6 address needs to be allocated by the AR 700.

Should the host 800 receive from the AR 700 the flag broadcasted as described at step 255 of FIG. 2, the value V(i) stored in the memory of the host 800 is no longer usable. The host 800 may request receipt of a new V(i) value, contained in a new RtAdv to be received from the AR 700, by sending a new RtSol message towards the AR 700, also comprising the lost synchronization indicator. The RtSol and RtAdv are, in this case also, preferably signed with the Ks.

The AR 700 may generate another OWHC intended for authenticating multicast ND Advertisements sent by the host 800. This is especially useful when a specific host 800 for which the IPv6 address is advertised, is expected to exchange messages with many other parties on the same link.

Figure 7:
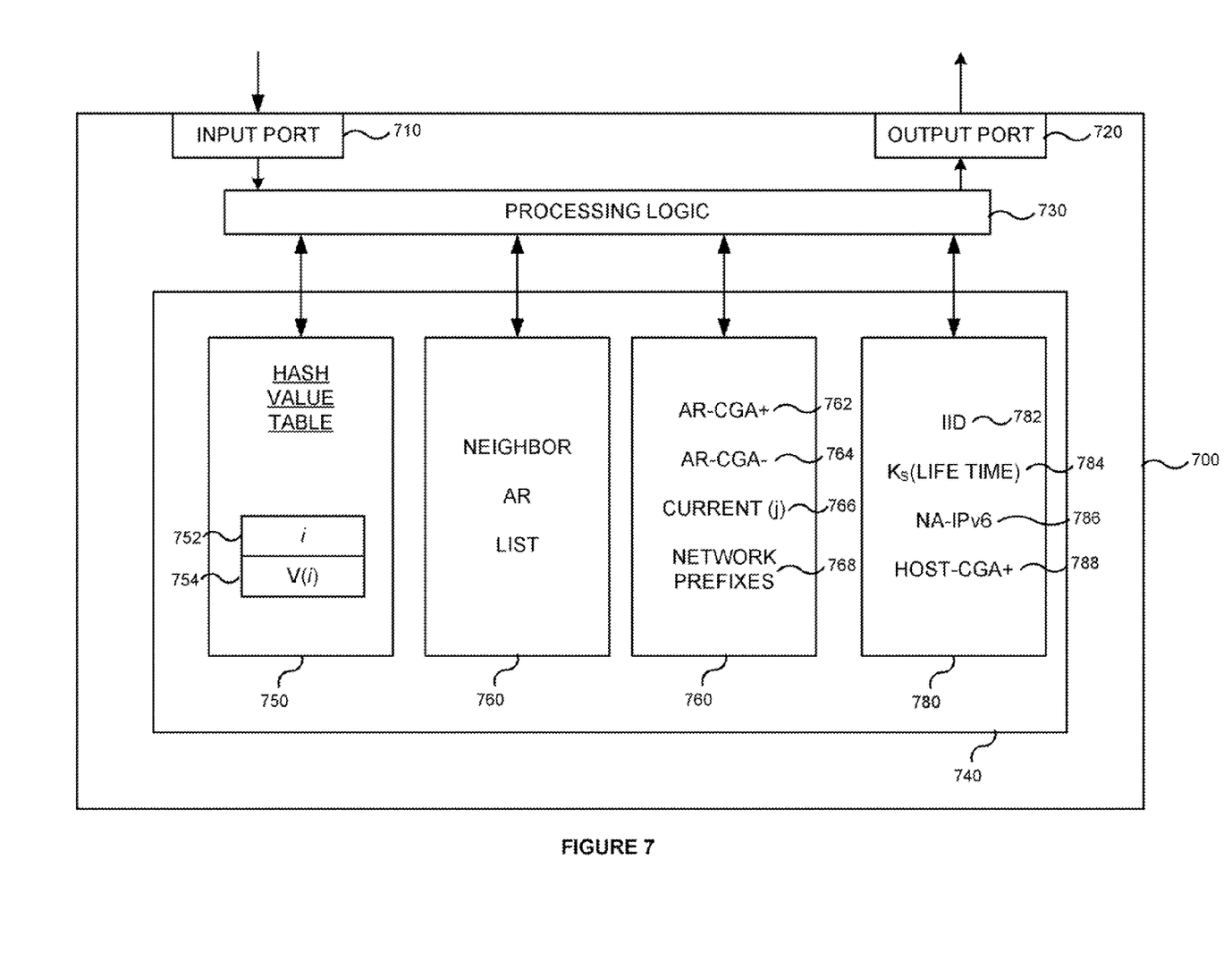
FIG. 7 shows an exemplary access router built to support secure communication with a host.

An exemplary construction of the AR 700 as used in the preceding figures, will now be described by reference to FIG. 7, which shows an exemplary access router built to support secure communication with a host. The access router 700 generally has all features of a generic router, but is also capable of acting as an end-point for providing service directly to hosts 800 and to allocate NA-IPv6 addresses thereto. The access router 700 comprises an input port 710, an output port 720 and a processing logic 730. The access router may further comprise a memory 740.

When a host 800 located in a domain of the access router 700 needs to establish a session with another party on the Internet, it needs to connect to the access router 700. The input port 710 receives from the host 800 a request to set up a connection. The request, preferably in form of a RtSol, comprises a CGA+ of the host 800. The RtSol may further have a first CGA signature based on a CGA− of the host 800. The processing logic 730 first verifies the CGA signature, if included in the RtSol. The processing logic 730 then generates a Ks for the host 800, and encrypts the Ks with the CGA+ of the host 800. The processing logic 730 then instructs the output port 720 to send the encrypted Ks, preferably comprised in a RtAdv, towards the host 800. The RtAdv is sent in unicast mode, dedicated to the intent of this host 800 only. Thereafter, when an event indicates that a new message needs to be sent towards the host, the processing logic 730 calculates a message signature based on the Ks and the output port sends the message comprising the message signature. Likewise, the input port 710 may receive from the host 800 a message having a Ks based signature. The processing logic 730 verifies the Ks based signature before processing further the message.

Preferably, the access router 700 comprises the memory 740 for storing the Ks 784; the Ks 784 may have a lifetime after which it will no longer be considered valid. The lifetime may be sent along with the Ks 784 in the RtAdv. The memory 740 also stores the CGA+ 788 of the host 800, received in the RtSol. The memory 740 further stores a CGA+ 762 and a CGA− 764 of the access router 700. If the CGA+ 762 and the CGA− 764 of the access router 700 are present, the processing logic 730 may calculate another CGA signature based on the CGA− 764 of the router. In this case, the dedicated RtAdv sent towards the host 800 comprises the CGA+ 762 of the router and with the CGA signature based on the CGA− 764 of the router.

In an alternate embodiment, the RtSol may also comprise an IID of the host 800. The processing logic 730 selects from the memory 740 one of a few network prefixes 768 and generates a NA-IPv6 address for the host 800 based on the IID and on the selected network prefix 768. The memory 740 stores the IID 782, and the NA-IPv6 address 786. Preferably, the memory 740 stores, in a host table 780, IIDs 782 and NA-IPv6 addresses 786 for a plurality of hosts 800. The processing logic scans in the host table 780 to verify whether the NA-IPv6 address 786 generated for the host 800 is already assigned to another host. If the NA-IPv6 address is found to be assigned to another host, the processing logic 730 generates another NA-IPv6 address 786 using another network prefix 768. In this alternate embodiment, the dedicated RtAdv further comprises the NA-IPv6 address.

The access router 700 broadcasts periodic RtAdv's sent in multicast towards all hosts 800 to which it is connected. In order to provide enhanced security to the periodic RtAdv's, the processing logic 730 may calculate a one-way hash chain of length "n", and identify public hash values from the one-way hash chain. A last generated value of the chain is a first public hash value, with an index of value equal to zero (0). Then, a second to last generated value is a second public hash value, with an index value equal to one (1), and so on, each subsequent value of the chain becoming a subsequent public hash value and each subsequent index being incremented by one (i) from the previous index. The memory 700 stores the one-way hash chain in a hash value table 750 comprising entries, each entry having a hash value V(i) 754 along with an index (i) 752. The memory 740 also stores a current index (j) 766, which identifies an entry of the table 750 having an index (i=j) and a last publicly disclosed hash value V(i=j). The input port 720 sends periodic RtAdv's, each subsequent periodic RtAdv comprising one subsequent hash value V(i=j) 4, which becomes publicly disclosed. As described in relation to FIG. 2, the current index (j) is incremented by one (1) with the sending of each periodic RtAdv.

The input port 710 may receive from a party, which may itself be another host, a router, and the like, a ND request indicating an intent to communicate with the host 800, If the party is another host, it should have a first signature based on the Ks of the party. The processing logic reads from the memory 740 the Ks 784 of the party, if the party has an entry in the host table 780, and verifies the first signature. Provided that the first signature is valid, the processing logic 730 reads from the memory 740 the Ks 784 of the host 800, in the table entry 780 for the host 800. The processing logic 730 calculates a second signature based on the Ks 784 of the host 800. The output port 720 forwards towards the host 800 the ND request having the second signature. The input port 710 then receives from the host 800 a ND advertisement comprising an address of the host 800, for example a MAC address of the host 800, also having a third signature. The processing logic 730 verifies the third signature based on the Ks 784 of the host 800. Provided that the third signature is valid, the processing logic 730 calculates a fourth signature based on the Ks 784 of the party. The output port 720 forwards towards the party the ND advertisement comprising the address of the host 800 and having the fourth signature.

In order to provide for mobility of the host 800 which may autonomously move towards a domain of a neighbor router, the memory 740 may store a neighbor table 760 comprising a plurality of neighbor access router identities. After having sent the dedicated RtAdv towards the host 800, the processing logic 730 reads the Ks 784 and reads, one by one, each of the plurality of neighbor router identities from the neighbor table 760, The processing logic 730 instructs the output port 720 to use the neighbor routers identities to send binding messages comprising the Ks 784, and preferably also the IID 782, of the host 800 towards each of the neighbor routers. When the access router 700 receives a binding message from a neighbor access router, for a new host 800 for which no entry currently exists in the host table 780, the memory 740 allocates a table entry for that new host 800 and stores the Ks 784 and the IID 782 of that new host 800. Later, as the new host 800 moves within the domain of the access router 700, the input port 710 receives from the new host 800 a new RtSol. The new RtSol has its own message signature based on the Ks of the new host 800. The processing logic 730 reads the Ks 784 of the new host 800 and verifies the signature of the new RtSol. Provided that the signature verification is correct, the processing logic 730 verifies that a new IID comprised in the RtSol is the same as the IID 782 stored in the host table 780. The processing logic 730 calculates a new NA-IPv6 address 786 for the new host 800, based on the IID 782 and based on one of the network prefixes 768, and stores the NA-IPv6 address 786 in the host table 780. The processing logic 730 then calculates another message signature based on the Ks 784 of the new host. The output port 720 then sends towards the new host a new dedicated RtAdv comprising the new NA-IPv6 address 786 and having the last calculated message signature.

Figure 8:
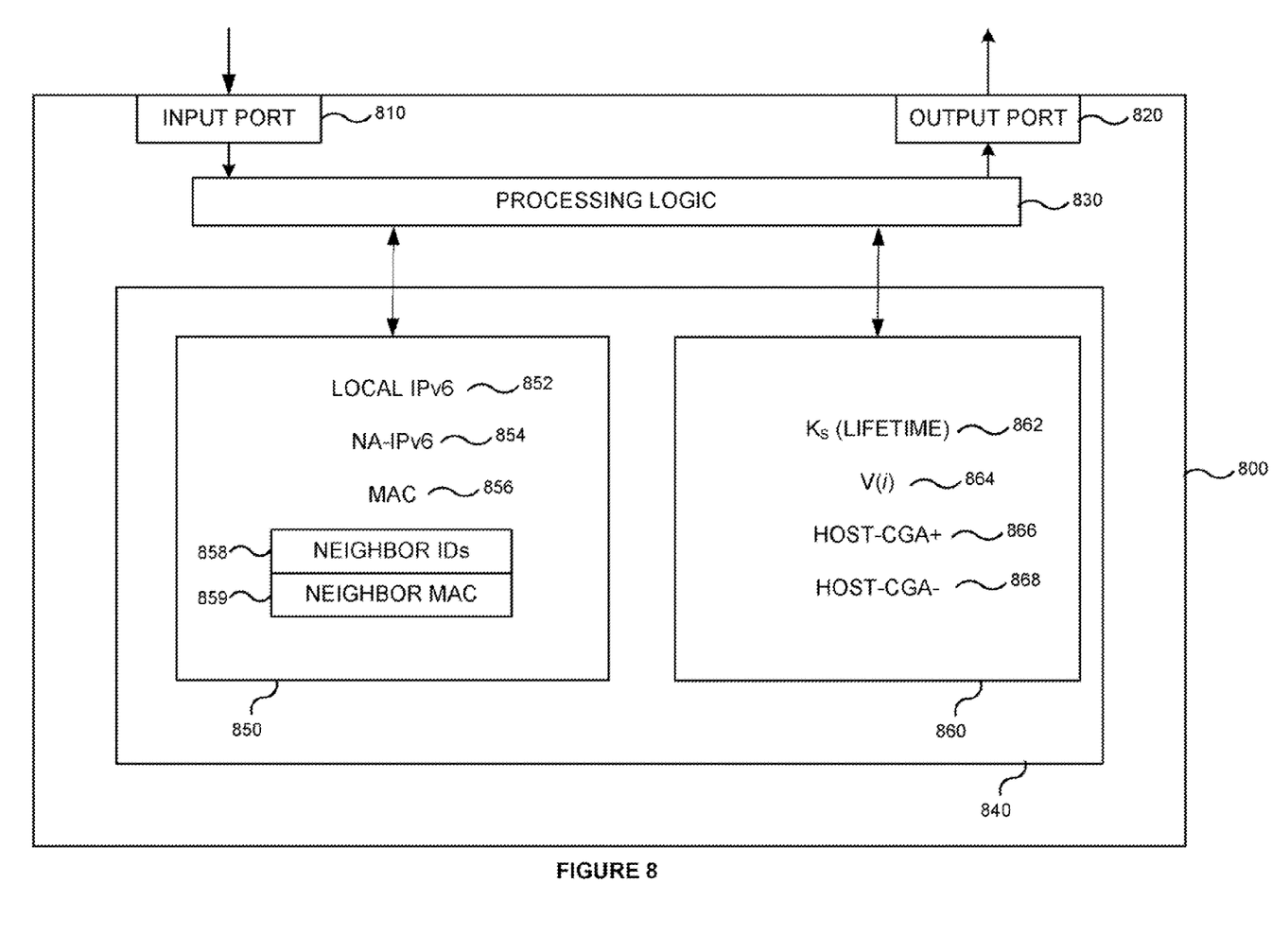
FIG. 8 shows an exemplary host built for having secure communication with a router.

An exemplary construction of the host 800 as used in the preceding figures, will now be described by reference to FIG. 8, which shows an exemplary host built for having secure communication with a router. The host 800 comprises an input port 810, an output port 820, a processing logic 830 and a memory 840. The memory 840 comprises an address 850 table and a security data table 860. When the host 800 enters the domain of the router 700, the processing logic 830 reads from the memory 840 a CGA+ 866 of the host 800, and instructs the output port 820 to send towards the router 700 the CGA+ 866, preferably comprised in a RtSol. Preferably, the processing logic 830 has, prior to the sending of the RtSol, calculated a message signature for the RtSol by use of the CGA− 868 of the host 800. The input port 810 receives an encrypted Ks, for example within a dedicated RtAdv. The dedicated RtAdv may have a signature added by the router 700, in which case the RtAdv also comprises a CGA+ of the router. The processing logic verifies the signature of the RtAdv by use of the CGA+ of the router. Then, preferably following verification of the RtAdv signature, the processing logic decrypts the encrypted Ks by use of the CGA− 868 of the host 800 and stores a Ks 862 in the memory 840. A lifetime of the Ks is also stored in the memory 840, if received along with the encrypted Ks. Thereafter, as the host 800 needs to send any message for traffic purposes towards the router 700, the processing logic 830 reads the Ks 862 and uses it to calculate a message signature. The traffic message comprising the message signature is sent towards the router 700 by the output port 820.

The RtSol may also be sent comprising local IPv6 address 852 read from the memory 840, the local IPv6 address 852 itself comprising an IID (not shown, but described in relation with FIG. 1). The dedicated RtAdv preferably comprises a NA-IPv6 address 852, which has been assigned by the router 700 using the IID. The NA-IPv6 address 852 is stored in the memory 840.

The dedicated RtAdv may comprise a publicly disclosed hash value V(i) 864 that is stored in the memory 840, following the signature verification mentioned hereinabove. Thereafter, the input port 810 may receive a periodic RtAdv comprising a new publicly disclosed hash value V(j). The processing logic 830 hashes the value V(j) and compares a result of the hashing with the value V(i) 864. If the result is not equal to the value V(i), the processing logic 830 may decide to ignore the periodic RtAdv. Alternatively, the processing logic 830 may hash once more the result and compare a new result of the second hashing with the value V(i). If no successful comparison is obtained after a limited number of attempts, the periodic RtAdv is ignored. If a positive comparison is obtained, the processing logic 830 accepts a content of the RtAdv. Notably, the value V(j) contained in the periodic RtAdv is used to overwrite the value V(i) 864 in the memory 840.

The memory 840 may comprise a media access control address 856 of the host 800 and a list of neighbor host identities 858. In order for the host 800 to communicate with a selected neighbor host from the list 858, the output port 820 sends towards the router 700 a ND request message, comprising the selected neighbor host identity 858. Prior to the sending of the ND request message, the processing logic 830 calculates a message signature for the ND request message, by use of the Ks 862. The input port 810 then receives from the router 700 a ND advertisement message comprising a MAC address of the neighbor host and having a message signature. The processing logic 830 verifies the message signature of the ND advertisement message by use of the KS 862. Provided that the signature is valid, the processing logic 830 instructs the output port 820 to send a data traffic message towards the selected neighbor host using its MAC address. Preferably, the memory 840 stores for the selected neighbor host the MAC address 859, in order to reuse it for further messages.

The host 800 may also receive at the input port 810, from the router 700, the ND request message. The router 700 has signed the ND request message with the Ks 862 of the host 800. The processing logic 830 verifies the Ks signature and, provided that the signature is valid, prepares the ND advertisement message comprising the MAC address 856 of the host 800. The processing logic 830 signs the ND advertisement message based on the Ks. The output port 820 then sends the ND advertisement message towards the router 700.

Although several aspects of the preferred embodiment of the method, of the access router and of the host of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

The invention claimed is:

1. A method of communicating between an Access Router (AR) and a host which receives connection service through said AR, the method comprising the steps of:
   receiving at the router a cryptographic public key of the host;
   generating at the AR a One-Way Hash Chain (OWHC);
   generating at the AR a secret key (Ks) for the host;
   encrypting at the AR an encrypted message encrypted with the cryptographic public key of the host, said encrypted message including said secret key and a hash value of said OWHC;
   sending from the AR towards the host the encrypted message;
   using the Ks, instead of using said cryptographic public and private keys, to sign subsequent messages exchanged between the AR and the host, wherein signing using said Ks requires less processing than encryption using said cryptographic public and private keys; and
   including values of the OWHC in broadcast messages sent by the AR to enable the AR to prove to the host that the broadcast messages are valid.

2. The method of claim 1, further comprising the steps of:
   decrypting the secret key by the host; and
   storing in the host the secret key.

3. The method of claim 2, further comprising the steps of:
sending from the AR towards the host a message having a secret key based signature; and
verifying at the host the secret key based signature before processing further the message.

4. The method of claim 2, further comprising the steps of:
sending from the host towards the AR a message having a secret key based signature; and
verifying at the AR the secret key based signature before processing further the message.

5. The method of claim 2, wherein:
a party sends towards the AR a neighbor discovery request indicating the host, the neighbor discovery request having a first signature based on a secret key of the party;
the AR verifies the first signature;
the AR forwards the neighbor discovery request towards the host, the neighbor discovery request having a second signature based on the secret key of the host;
the host verifies the second signature;
the host sends a neighbor discovery advertisement towards the AR, the neighbor discovery advertisement comprising an address of the host and having a third signature based on the secret key of the host;
the AR verifies the third signature;
the AR forwards the neighbor discovery advertisement towards the party, the neighbor discovery advertisement comprising the address of the host and having a fourth signature based on the secret key of the party;
the party verifies the fourth signature; and
the party sends a message towards the host by use of the address of the host.

6. The method of claim 1, wherein:
the cryptographic public key of the host is comprised in a router solicitation message; and
the encrypted message is comprised in a dedicated router advertisement message.

7. The method of claim 6, wherein:
the router solicitation message has a cryptographic signature based on a cryptographic private key of the host;
the AR verifies the cryptographic signature of the router solicitation message; and
the dedicated router advertisement message further comprises a cryptographic public key of the AR and has a cryptographic signature based on a cryptographic private key of the AR.

8. The method of claim 7, wherein:
the host verifies the cryptographic signature of the dedicated router advertisement message;
the host decrypts the secret key by use of the cryptographic private key of the host; and
the host stores the secret key.

9. The method of claim 8, wherein:
the AR sends a binding message towards a neighbor router, the binding message comprising the cryptographic public key of the host and the secret key;
the neighbor router stores the cryptographic public key of the host and the secret key;
the neighbor router receives a new router solicitation message having a new cryptographic signature based on the secret key;
the neighbor router verifies the new cryptographic signature of the new router solicitation message; and
the neighbor router sends towards the host a new dedicated router advertisement message having a cryptographic signature based on the secret key.

10. The method of claim 9, wherein:
the binding message further comprises the interface identifier of the host;
the neighbor router further stores the interface identifier of the host;
the new router solicitation message comprises a received interface identifier of the host;
the neighbor router verifies the received interface identifier by use of the stored interface identifier of the host;
the neighbor router generates a new network allocated internet protocol address for the host based on the interface identifier of the host; and
the new dedicated router advertisement message comprises the new network allocated internet protocol address.

11. The method of claim 6, wherein:
the router solicitation message further comprises an interface identifier of the host;
the AR generates an internet protocol address for the host based on the interface identifier of the host and on a network prefix; and
the dedicated router advertisement message further comprises the network allocated internet protocol address.

12. The method of claim 11, wherein:
the AR verifies whether the network allocated interne protocol address is already allocated to another party; and
if the address is already allocated to another party, the AR regenerates the network allocated internet protocol address using another network prefix before sending the dedicated router advertisement message.

13. The method of claim 6, further comprising the steps of:
calculating in the AR a one-way hash chain;
identifying in the AR public hash values from the one-way hash chain, wherein a last generated value of the chain is a first public hash value and wherein subsequent values of the chain are subsequent public hash values;
sending from the AR periodic router advertisement messages, wherein each subsequent periodic advertisement message publicly discloses a subsequent public hash value;
wherein the dedicated router advertisement message further comprises a last publicly disclosed hash value; and
wherein the host stores the last publicly disclosed hash value.

14. The method of claim 13, wherein:
the host receives one of the periodic router advertisement messages;
the host hashes one public hash value contained in the one of the periodic router advertisement messages;
the host compares a result of the hashing with the stored last publicly disclosed hash value; and
if the result matches the stored last publicly disclosed hash value, the host stores information contained in the one of the periodic router advertisement messages.

15. An Access Router (AR) for communicating with a host which connects to a network via such an AR, said AR comprising:
an input port that receives from the host a cryptographic public key of the host;
a processing logic that generates a secret key for the host, generates a One-Way Hash Chain (OWHC), encrypts the secret key and a hash value of said OWHC with the cryptographic public key of the host, and calculates a first message signature based on the secret key;
a memory comprising the secret key; and
an output port that sends the encrypted secret key and sends a message comprising the first message signature and further sends values of the OWHC in broadcast messages to enable the AR to prove to the host that the broadcast messages are valid.

16. The AR of claim 15, wherein:
the cryptographic public key of the host is received in a router solicitation message; and
the encrypted secret key is sent in a dedicated router advertisement message.

17. The AR of claim 16, wherein:
the memory stores a cryptographic public key of the AR and a cryptographic private key of the AR;
the router solicitation message has a first cryptographic signature based on a cryptographic private key of the host;
the processing logic verifies the cryptographic signature of the router solicitation message and calculates a second cryptographic signature based on the cryptographic private key of the router; and
the dedicated router advertisement message further comprises the cryptographic public key of the router and has the second cryptographic signature.

18. The AR of claim 16, wherein:
the router solicitation message further comprises an interface identifier of the host;
the processing logic generates an internet protocol address for the host based on the interface identifier and on one of one or more network prefixes; and
the memory stores the interface identifier for the host, the internet protocol address generated for the host, and the one or more network prefixes; and
the dedicated router advertisement message further comprises the network allocated internet protocol address.

19. The AR of claim 18, wherein:
the memory stores in a table interface identifiers and internet protocol addresses for a plurality of hosts;
the processing logic scans in the table to verify whether the internet protocol address generated for the host is already assigned to another host; and
if the internet protocol address is already ssigned to another host, the processing logic generates another internet protocol address using another network prefix.

20. The AR of claim 16, wherein:
the processing logic calculates said a one-way hash chain and identifies public hash values from the one-way hash chain, wherein a last generated value of the chain is a first public hash value and wherein subsequent values of the chain are subsequent public hash values;
the memory stores the one-way hash chain and a last publicly disclosed hash value;
the output port sends periodic router advertisement messages, wherein each subsequent periodic advertisement message publicly discloses one subsequent public hash value; and
wherein the dedicated router advertisement message further comprises the last publicly disclosed hash value.

21. The AR of claim 16, wherein:
the memory allocates a table entry for a second host and stores a secret key of the second host in the table entry for the second host;
the input port receives from a neighbor router a binding message comprising the secret key of the second host, and further receives from the second host a new router solicitation message having a second message signature based on the secret key of the second host;
the processing logic verifies the second message signature of the new router solicitation message and calculates a third message signature based on the secret key of the second host; and
the output port sends towards the second host a new dedicated router advertisement message having the third message signature.

22. The AR of claim 21, wherein:
the memory stores a table comprising a plurality of neighbor router identities;
the processing logic reads one by one each of the plurality of neighbor router identities, and reads the secret key of the host and the secret key of the second host; and
the output port uses the neighbor routers identities to send binding messages comprising the secret key of the host and to send binding messages comprising the secret key of the second host.

23. The AR of claim 21, wherein:
the binding message further comprises an interface identifier of the second host;
the memory stores the interface identifier of the second host in the table entry for the second host;
the new router solicitation message comprises a received interface identifier of the second host;
the processing logic verifies the received interface identifier by use of the interface identifier of the second host stored in the table entry for the second host;
the processing logic generates the new network allocated internet protocol address for the second host based on the interface identifier of the second host; and
the new dedicated router advertisement message comprises the new network allocated internet protocol address.

24. The AR of claim 15, wherein:
the input port receives from the host towards a message having a secret key based signature; and
the processing logic verifies the secret key based signature before processing further the message.

25. The AR of clai1548, wherein:
the memory stores a secret key of a party;
the input port receives from the party a neighbor discovery request indicating the host, the neighbor discovery request having a first signature based on the secret key of the party, and receives from the host a neighbor discovery advertisement comprising an address of the host and having a third signature based on the secret key of the host;
the processing logic reads from the memory the secret key of the host and the secret key of the party, verifies the first signature based on the secret key of the party, calculates a second signature based on the secret key of the host, verifies the third signature based on the secret key of the host and calculates a fourth signature based on the secret key of the party; and
the output port forwards towards the host the neighbor discovery request having the second signature, and forwards towards the party the neighbor discovery advertisement comprising the address of the host and having the fourth signature.

26. A host device for communicating with an Access Router (AR) which provides to said host device a connection service, said host device comprising:
an output port that sends towards the AR a cryptographic public key of the host and sends towards the AR a traffic message comprising a first message signature, wherein the first message signature is a secret key signature;

an input port that receives an encrypted secret key and hash values of a One-Way Hash Chain (OWHC) generated by and sent from said AR ;

a processing logic that decrypts the secret key with a cryptographic private key of the host, performs hashing operations to verify hash values received from said AR belong to said OWHC and calculates secret key signatures; and a memory comprising the secret key, the cryptographic public key of the host and the cryptographic private key of the host.

27. The host device of claim 26, wherein:
the cryptographic public key of the host is sent in a router solicitation message; and
the encrypted secret key is received in a dedicated router advertisement message.

28. The host device of claim 27, wherein:
the processing logic calculates a second message signature based on the cryptographic private key of the host;
the router solicitation message has the second message signature.

29. The host device of claim 28, wherein:
the dedicated router advertisement message has a third message signature and comprises a cryptographic public key of the router;
the processing logic verifies the third message signature by use of the cryptographic public key of the router; and
the memory stores the secret key upon verification of the third message signature.

30. The host device of claim 27, wherein:
the router solicitation message comprises an interface identifier;
the dedicated router advertisement message comprises an internet protocol address; and
the memory stores the interface identifier and the internet protocol address.

31. The host device of claim 27, wherein:
the dedicated router advertisement message comprises a first hash value of said OWHC;
the memory stores the first hash value;
the input port receives a periodic router advertisement message comprising a second hash value; and
the processing logic hashes the second hash value, compares a result of the hashing with the first hash value, and ignores the periodic router advertisement message if the result is not equal to the first hash value.

32. The host device of claim 26, wherein:
the memory comprises a media access control address and a list of neighbor host identities;
the output port sends towards the router a neighbor discovery request message, comprising a selected neighbor host identity, and a neighbor discovery advertisement message, comprising the media access control address, both messages being signed with secret key signatures;
the input port receives from the router the neighbor discovery request message; and
responsive to receipt of the neighbor discovery request message, if the processing logic correctly verifies the secret key signature contained therein, the processing logic instructs the output port to send the neighbor discovery advertisement message.

33. The host device of claim 32, wherein:
the memory stores media access control addresses for each entry in the list of neighbor host identities;
the input port receives from the router the neighbor discovery advertisement message; and
responsive to receipt of the neighbor discovery advertisement message, if the processing logic correctly verifies the secret key signature contained therein, the processing logic stores the media address control address in the entry of the selected neighbor host identity, and instructs the output port to send a data traffic message using the media access control address.

* * * * *

UNITED STATES PATENT AND TRADEMARK OFFICE
CERTIFICATE OF CORRECTION

| | |
|---|---|
| PATENT NO. | : 7,949,876 B2 |
| APPLICATION NO. | : 11/617260 |
| DATED | : May 24, 2011 |
| INVENTOR(S) | : Haddad |

It is certified that error appears in the above-identified patent and that said Letters Patent is hereby corrected as shown below:

In Column 14, Line 25, in Claim 12, delete "interne" and insert -- internet --, therefor.

In Column 15, Line 41, in Claim 19, delete "ssigned" and insert -- assigned --, therefor.

In Column 16, Line 40, in Claim 25, delete "clai1548," and insert -- claim 15, --, therefor.

In Column 18, Line 15, in Claim 32, delete "identit$_y$," and insert -- identity, --, therefor.

Signed and Sealed this
Twenty-fifth Day of October, 2011

David J. Kappos
*Director of the United States Patent and Trademark Office*